United States Patent
Nalawadi et al.

(10) Patent No.: US 7,243,041 B2
(45) Date of Patent: Jul. 10, 2007

(54) GUID, PNPID, ISOCHRONOUS BANDWIDTH BASED MECHANISM FOR ACHIEVING MEMORY CONTROLLER THERMAL THROTTLING

(75) Inventors: Rajeev K. Nalawadi, Folsom, CA (US); Murali Ramadoss, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 10/957,372

(22) Filed: Sep. 30, 2004

(65) Prior Publication Data

US 2006/0069525 A1   Mar. 30, 2006

(51) Int. Cl.
*G06F 15/00* (2006.01)

(52) U.S. Cl. .............. 702/132; 702/136; 345/531; 345/532

(58) Field of Classification Search .......... 702/130, 702/132–136; 716/1, 8, 10; 712/32, 12; 710/261–266, 113, 116, 317; 714/718, 719, 714/720; 365/189.01, 230.3, 233; 711/218, 711/213; 345/530–532
See application file for complete search history.

(56) References Cited

U.S. PATENT DOCUMENTS

| | | | | |
|---|---|---|---|---|
| 5,784,291 A | * | 7/1998 | Chen et al. | 716/10 |
| 5,911,153 A | * | 6/1999 | Dhong et al. | 711/218 |
| 6,216,235 B1 | * | 4/2001 | Thomas et al. | 713/501 |
| 6,442,700 B1 | * | 8/2002 | Cooper | 713/320 |
| 6,470,289 B1 | * | 10/2002 | Peters et al. | 702/132 |
| 6,600,493 B1 | * | 7/2003 | Sethi et al. | 345/543 |
| 2005/0015702 A1 | * | 1/2005 | Shier et al. | 714/776 |

* cited by examiner

*Primary Examiner*—John Barlow
*Assistant Examiner*—Hien Vo
(74) *Attorney, Agent, or Firm*—Blakely, Sokoloff, Taylor & Zafman LLP (57) ABSTRACT

A device to control memory bandwidth including a processing unit and a memory connected to the processing unit, the memory having a memory controller driver to issue at least one command based on a memory bandwidth requirement of another driver process. A memory controller to direct data to and from the memory. An active cooling device is connected to the processing unit and a thermal sensor.

16 Claims, 5 Drawing Sheets

| GUID/PnPID/ VendorID-DeviceID | Driver/Application | Minimum Bandwidth Requirement -> Memory | Maximum Bandwidth Requirement -> Memory |
|---|---|---|---|
| 8086-2152 | Graphics | 10Mbytes/sec | 150Mbytes/sec |
| 8086-1C00 | Audio | 2Mbytes/sec | 10Mbytes/sec |
| xxxx-yyyy | PCI Express TV Tuner (1 stream) | 80Mbytes/sec | 120Mbytes/sec |
| ..... | ..... | ..... | ..... |
| 8086-2f00 | Wireless LAN | 250kbytes/sec | 54Mbits/sec |
| GUID-1 (128bit) | Media Playback Application | 1.5Mbytes/sec | 6Mbytes/sec |
| GUID-2 (128bit) | USB based VOIP Phone | 10Mbytes/sec | 20Mbytes/sec |

GUID, PNPID, ISOCHRONOUS BANDWIDTH BASED MECHANISM FOR ACHIEVING MEMORY CONTROLLER THERMAL THROTTLING

BACKGROUND

1. Field

Embodiments of the invention are generally related to memory bandwidth management and thermal throttling, and more particularly related to using device identification for memory bandwidth allocation and control of active cooling based on memory bandwidth management.

2. Description of the Related Art

In today's computer systems, such as personal computers (PCs), servers, notebooks, etc., the sum of all the included components thermal design power (TDP) is becoming greater than the cooling capability of the system. Hardware mechanisms that can throttle down processing speed effect basic functionally and capabilities of the systems. For example, certain audio applications demand a constant 10 Mbytes/sec. isochronous bandwidth. That is, isochronous applications require guaranteed bandwidth and deterministic latency starting from the device to the end source (memory). The main attribute of an isochronous stream is to guarantee quality of service (QOS). Therefore, if a system throttles down, media performance (audio/video performance) can be compromised.

Current operating systems do not support a bandwidth manager for memory. The available memory bandwidth varies by multiple factors, which are platform dependent, such as processor front side bus speed, memory speed (e.g., double data rate (DDR) 200/266/333/400 MHz), dual channel versus single channel, etc. Therefore, with the higher sum TDP and minimum memory bandwidth requirements for audio/video streams, current systems cannot meet the demands of cooling and guaranteeing high bandwidth requirements without compromising platform performance, such as applications, processor speed, etc. or causing detrimental effect of inefficient cooling.

BRIEF DESCRIPTION OF THE DRAWINGS

Embodiments are illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

The embodiments discussed herein generally relate to memory bandwidth management based on device identification and thermal throttling. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Figure 1:
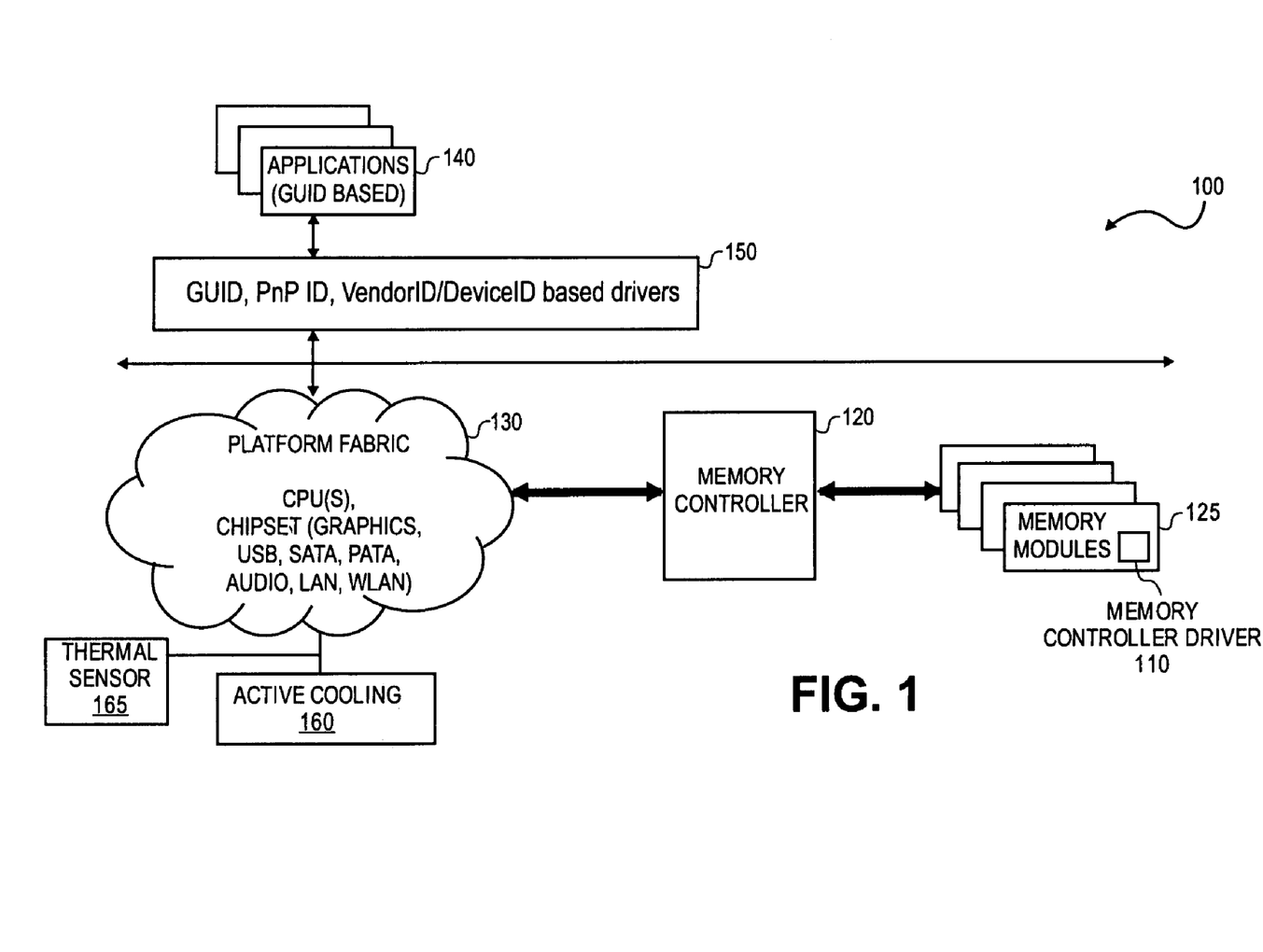
FIG. 1 illustrates an embodiment including a memory controller driver.

FIG. 1 illustrates an embodiment to control memory bandwidth. Device 100 includes processing unit 130, which is connected to memory controller 120 and memory 125. Memory 125 has memory controller driver process 110. Memory controller 120 directs data to and from memory 125. Active cooling device 160 is connected to processing unit 130 and thermal sensor 165. Memory controller driver process 110 issues at least one command based on memory bandwidth requirements of other driver processes to activate active cooling device 165 and to suspend or terminate applications to allow for meeting guaranteed bandwidth requirements. Thermal sensor 165 senses temperature and transmits a signal or command to memory controller driver process 110. In turn, memory controller driver process can issue a command to active cooling device 160 to activate based on the temperature sensed. In one embodiment, active cooling device is a cooling fan. In another embodiment, active cooling device is a liquid based cooling device.

In one embodiment, memory controller driver process 110 allocates a guaranteed memory bandwidth for at least one isochronous application, such as an audio or video stream. In another embodiment, memory controller driver process 110 allocates a minimum memory bandwidth for multiple applications and activates active cooling device 160 to reduce temperature of processing unit 130, as well as other devices connected to or in the vicinity of processing unit 130.

In one embodiment, memory controller driver process 110 generates a table including minimum bandwidth and maximum bandwidth requirements for applications based on identification of the applications that is contained in the application device drivers. The minimum and maximum memory bandwidth requirements are standard for various types of applications and associated devices. For example, an audio application having an identification of 8086-1C00 has a minimum memory bandwidth requirement of 2 Mbytes/sec. and a maximum memory bandwidth requirement of 10 Mbytes/sec.

In one embodiment, the driver contains identification, such as a globally unique identifier (GUID), a plug and play identifier (PnPID), a vendor identifier (ID), a device ID, etc. It should be noted that a GUID is a 128 bit integer (16 bytes) that can be used across all computers and networks wherever a unique identifier is required. An GUID has a low probability that it will be duplicated. A PnPID is a plug and play device ID that allows an operating system (OS) to uniquely recognize the particular device so the OS can load the appropriate driver software. For example, a PnPID of PNP0A03 represents a peripheral component interconnects (PCI) host bridge; PNP0A08 represents a PCI express host bridge.

Figure 2:
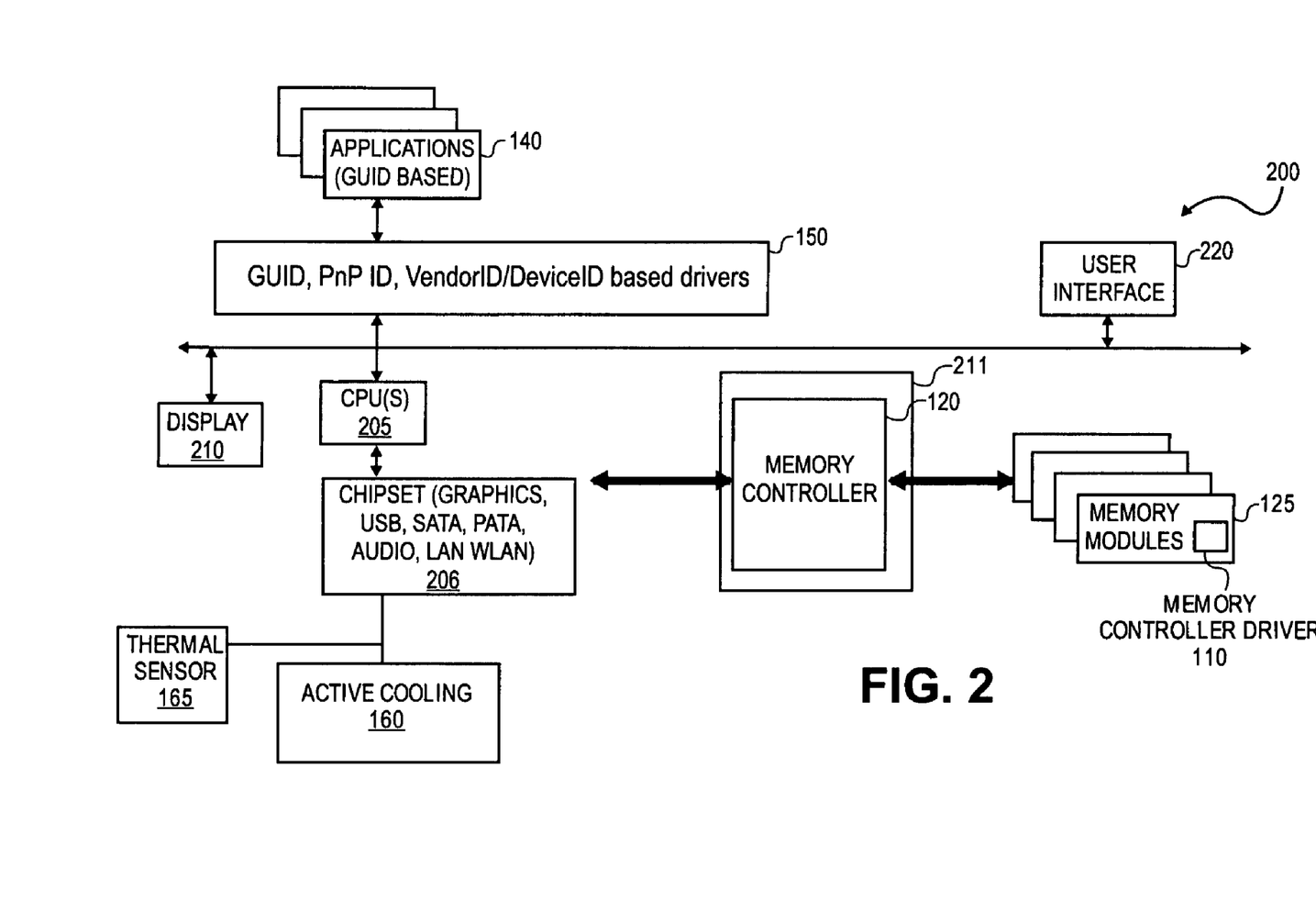
FIG. 2 illustrates an embodiment including a system with a memory controller driver.

FIG. 2 illustrates a system including memory controller driver process 110, central processing unit (CPU) 205 and chipset 211 having memory controller 120 is connected to the CPU. At least one memory module 125, such as random access memory (RAM), cache memory, etc., is connected to memory controller 120. Memory controller driver process 110 in memory module 125 monitors memory bandwidth on CPU 205, manages application performance based on memory bandwidth and controls active cooling device 160.

System 200 further includes an active cooling device connected to CPU 205 and thermal sensor 165. Memory controller driver process 110 activates active cooling device 160 responsive to thermal sensor 165 and memory bandwidth allocation. Memory controller driver process 110 allocates guaranteed memory bandwidth for applications requiring a constant bandwidth, such as isochronous audio/video streaming applications. In one embodiment memory controller driver process 110 allocates minimum memory bandwidth for running applications and controls temperature of the CPU by activating active cooling device 160.

In one embodiment memory controller driver process 110 retrieves a table including minimum bandwidth and maximum bandwidth requirements for applications based on identification, and determines memory bandwidth allocations based on a table. That is, a table lookup is used to determine associated minimum and maximum bandwidth requirements for a device identifier, such as a GUID, PnPID, a vendor ID, a device ID, etc.

In one embodiment system 200 includes display 210 and user interface 220. Display 210 can be any appropriate display device, such as a flat screen display, liquid crystal display (LCD), cathode ray tube (CRT), etc. User interface 220 can be multiple user interfaces, including, but not limited to, a mouse, a keyboard, a resistive digitizer (i.e., touchscreen), a microphone, a speaker, etc.

Figure 3:
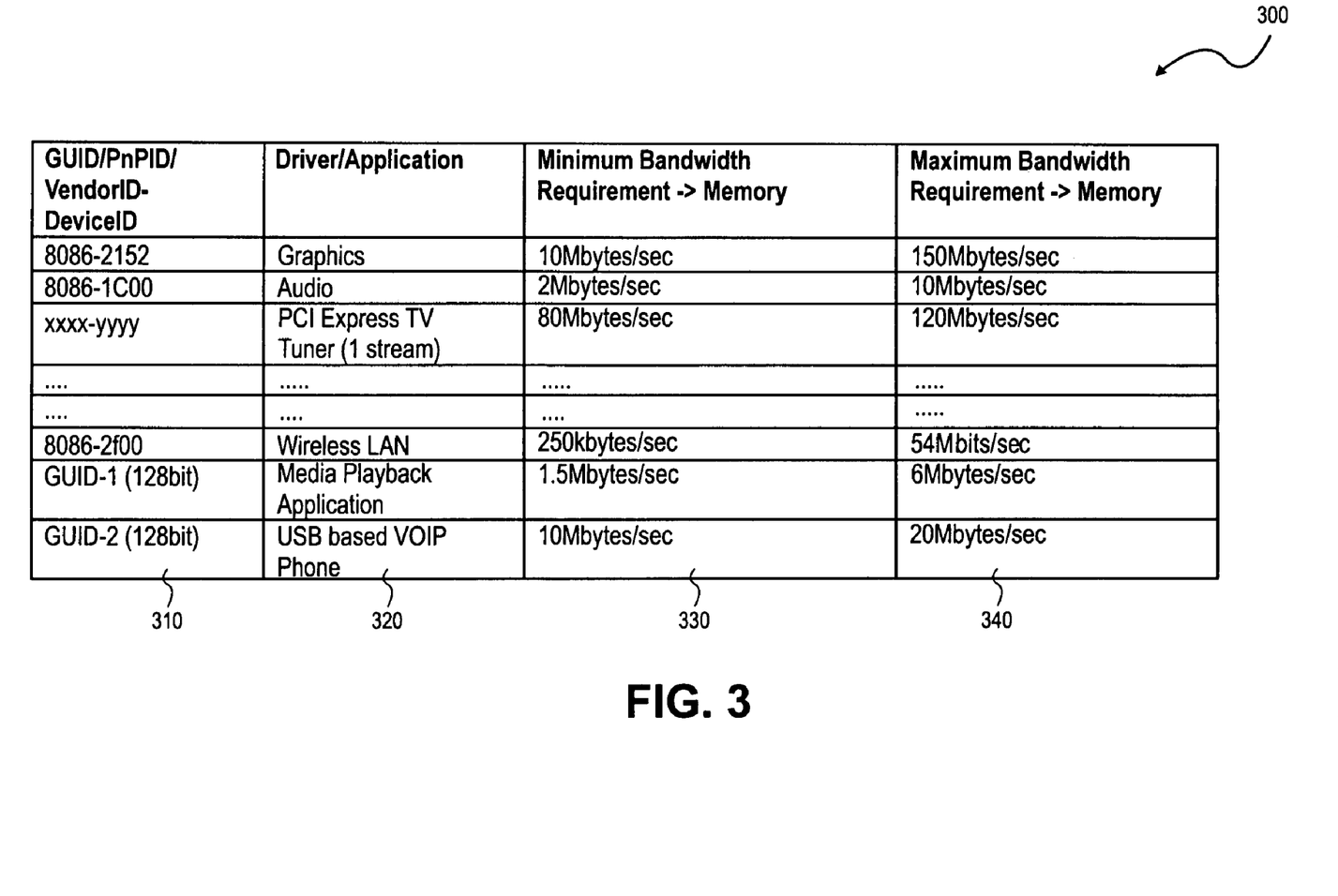
FIG. 3 illustrates device identification and associated minimum and maximum bandwidth requirements.

FIG. 3 illustrates a sample table that associates device identifiers with type of application, and minimum and maximum memory bandwidth requirements. The column 310 of table 300 contains device identifiers. Column 320 contains the type of application, end device, etc. Column 330 contains the minimum memory bandwidth requirement. Column 340 contains the maximum memory bandwidth requirement. When a table lookup is carried out on table 300 with a known device identifier, once the same identifier is found in the table, the minimum and maximum bandwidth requirements are transferred to memory controller driver process 110, which manages memory bandwidth of all applications based on the memory bandwidth requirements, type of application (e.g., isochronous), necessity (i.e., whether an application can be idled or terminated). In another embodiment, all known device identifiers and their respective minimum and maximum memory bandwidth requirements are contained in a database, table or memory. Upon an application initiation, table 300 is created to contain only the data for the current applications from the database, table or memory containing all known identifiers and respective memory bandwidth requirements.

Figure 4:
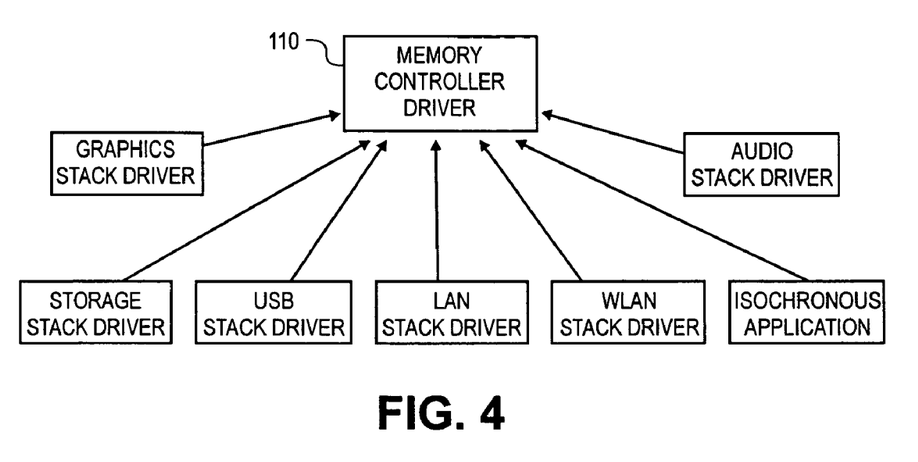
FIG. 4 illustrates device identification reporting for an embodiment.

FIG. 4 illustrates various device drivers that transfer their respective identifiers to memory controller driver 110, which in turn allows memory controller driver 110 to determine minimum and maximum memory bandwidth requirements for each device through a table lookup of table 300.

Figure 5:
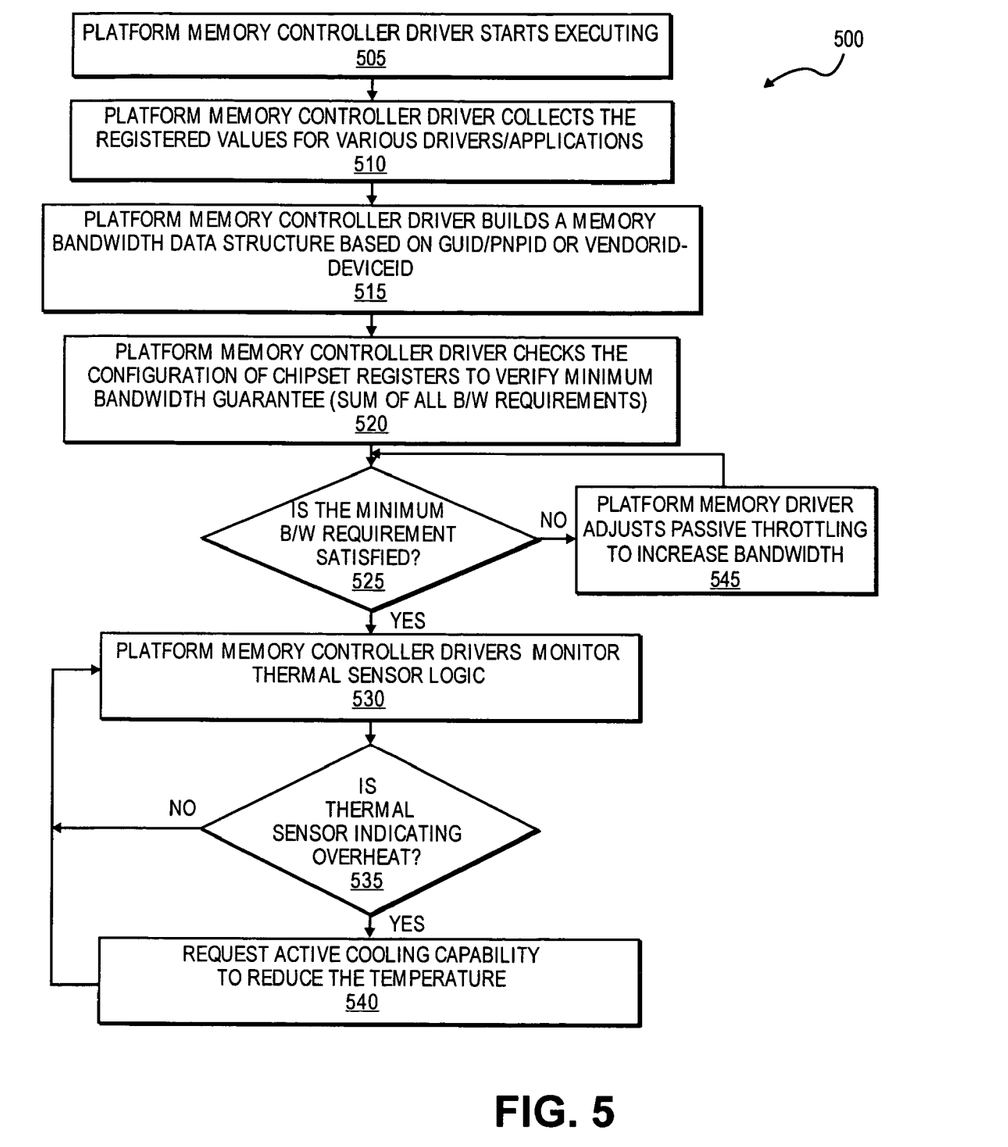
FIG. 5 is an embodiment of a process for memory bandwidth management and thermal throttling.

FIG. 5 illustrates an embodiment of a block diagram for a process. Process 500 begins with block 505 where memory controller driver process is initiated, for example upon booting of a computer, system, server, etc. Process 500 continues with block 510 where registered bandwidth values are stored for a plurality of applications. In block 515 a data structure is created including an association between memory bandwidth minimum and maximum requirements and device identifiers. In one embodiment, the data structure is a table. In another embodiment, the data structure is a database. In block 520, the sum of all bandwidth requirements is determined for all of the running applications and a verification is made to guarantee the minimum required memory bandwidth.

In block 525 it is determined if the minimum memory bandwidth guarantee is satisfied or not. If it is determined that the minimum memory bandwidth guarantee is met, block 530 continues to monitor a thermal sensor for an overheat condition of a processor or chipset. In block 535 it is determined whether or not the thermal sensor is indicating an overheat condition. If it is determined that an overheat condition exists, block in 540 a signal to activate an active cooling device is generated and blocks 530, 535 and 540 continues for thermal control. If block 525 determines that the memory bandwidth requirement is not satisfied, block 545 passive memory bandwidth throttling is performed. In one embodiment there are two loops that continue in parallel, blocks 530, 535 and 540, and blocks 525 and 545, respectively.

In one embodiment active cooling includes engaging a fan if the overheat condition exists. In another embodiment, a liquid cooling device is activated. In another embodiment the device identifiers in the table created in block 515 include includes identifiers such as GUID, PnPID, vendor ID, device ID, etc. In yet another embodiment memory bandwidth values are allocated for applications lacking an identifier. That is, predetermined values based on application type are stored and assigned to the application not having an identifier. In one embodiment, a temporary identifier is assigned for the application.

In one embodiment in process 500 the passive memory bandwidth throttling includes increasing allocated memory bandwidth for at least one application and determining if another application can be paused or terminated. In another embodiment throttling includes decreasing at least one application's allocated memory bandwidth. Therefore, allocated memory bandwidths are continuously adjusted to meet minimum memory bandwidth requirements.

In one embodiment a machine-accessible medium containing instructions that, when executed, cause a machine, such as a computing unit to transmit registered values for many applications to a memory controller driver. The memory controller driver maintains minimum bandwidth requirements for all the applications. Active cooling is provided for a device, such as a CPU, a chipset, a processor, a power supply, etc. It should be noted that active cooling can also be provided for many other devices.

In one embodiment active cooling is provided by instructions to engage a fan while an overheat condition exists. In another embodiment active cooling is provided by instructions to activate a liquid cooling device. In another embodiment further instructions create a table of memory bandwidth requirements for each of the applications and the table of memory bandwidth requirements is based on identifiers, such as GUID, PnPID, a vendor ID, a Device ID, etc.

In another embodiment machine-accessible medium further contains instructions that, when executed, cause the machine to supply memory bandwidth values for applications lacking an identifier. That is, predetermined values based on application type are stored and assigned to the application not having an identifier. In one embodiment, a temporary identifier is assigned for the application.

In yet another embodiment the machine-accessible medium further contains instructions that, when executed, cause the machine to increase memory bandwidth for at least one application and determine if another application can be one of idled and terminated, based on usage (e.g., the application has not been accessed for quite a while), criticality (e.g., an application such as a calculator program, etc.) and priority.

The above embodiment ensure a minimum guaranteed bandwidth to increase a user's experience with various applications and increases management of thermals on a platform. The above embodiments also work with other power management schemes, which can reduce processing speed causing isochronous applications to become "choppy" to guarantee the minimum isochronous memory bandwidth transparently to a user.

The above embodiments can also be stored on a device or machine-readable medium and be read by a machine to perform instructions. The machine-readable medium includes any mechanism that provides (i.e., stores and/or transmits) information in a form readable by a machine (e.g., a computer, PDA, cellular telephone, etc.). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention may not be limited to the specific constructions and arrangements shown and described, since various other modifications may occur to those ordinarily skilled in the art.

What is claimed is:

1. An apparatus to control memory bandwidth comprising:
    a processing unit;
    a memory coupled to the processing unit, the memory having a memory controller driver to issue at least one command based on a memory bandwidth requirement of another driver;
    a memory controller to direct data to and from the memory; and
    an active cooling device coupled to the processing unit and a thermal sensor,
    wherein the memory controller driver operates to perform passive memory bandwidth throttling to increase memory bandwidth for at least one application and to determine if another application can be paused, and the memory controller driver operates to create a table including minimum bandwidth and maximum bandwidth requirements for applications based on identification.

2. The apparatus of claim 1, wherein the memory controller driver is further to allocate guaranteed memory bandwidth for at least one isochronous application.

3. The apparatus of claim 1, the memory controller driver is further to allocate minimum memory bandwidth and to activate the active cooling device to reduce a temperature of the processing unit.

4. The apparatus of claim 1, wherein identification of the applications is one of a globally unique identifier (GUID), a plug and play identifier (PnPID), a vendor identifier (ID), and a device ID.

5. A system comprising:
    a central processing unit (CPU);
    a chipset having a memory controller coupled to the CPU, the memory controller having a memory controller driver to monitor memory bandwidth on the CPU, to manage application performance based on memory bandwidth and to control active cooling; and
    at least one memory module coupled to the memory controller, the at least one memory module having a data structure including minimum bandwidth and maximum bandwidth requirements for applications based on an application identifier,
    wherein the memory controller driver operates to perform passive memory bandwidth throttling to increase memory bandwidth for at least one application and to determine if another application can be paused.

6. The system of claim 5, further comprising:
    an active cooling device coupled to the CPU; and
    a thermal sensor coupled to the active cooling device to signal the memory controller driver to activate the active cooling device.

7. The system of claim 6, further comprises: the memory controller driver is to allocate guaranteed memory bandwidth for at least one application, the at least one application requiring a constant bandwidth.

8. The system of claim 5, the memory controller driver operates to allocate minimum memory bandwidth for running applications and to control temperature of the CPU.

9. The system of claim 5, wherein the identifier is one of a globally unique identifier (GUID), a plug and play identifier (PnPID), a vendor identifier (ID), and a device ID.

10. A method comprising:
    storing registered bandwidth values for a plurality of applications;
    determining a sum of all bandwidth requirements for the plurality of applications;
    performing passive memory bandwidth throttling if a minimum sum bandwidth requirement is not met by increasing memory bandwidth for at least one application and determining if another application can be paused;
    providing active cooling for a device if an overheat condition exists; and
    allocating memory bandwidth values for applications lacking an identifier.

11. The method of claim 10, the providing active cooling comprising:
    engaging a fan if the overheat condition exists.

12. The method of claim 10, further comprising:
    creating a data structure based on identifiers for each of the plurality of applications,
    wherein the identifiers include any of a globally unique identifier (GUID), a plug and play identifier (PnPID), a vendor identifier (ID), and a device ID.

13. The method of claim 12, wherein creating comprises:
storing in the data structure minimum bandwidth and maximum bandwidth requirements for applications based on the identifiers.

14. A machine-accessible medium containing instructions that, when executed, cause a machine to:
transmit registered values for a plurality of applications to a memory controller driver, the memory controller driver to maintain minimum bandwidth requirements for the plurality of applications by increasing memory bandwidth for at least one application and determining when another application can be one of idled and terminated;
determine bandwidth allocation for the plurality of applications;
provide active cooling for a device; and
supply memory bandwidth values for applications lacking an identifier.

15. The machine-accessible medium of claim 14, the providing active cooling comprising instructions to:
engage a fan if an overheat condition exists.

16. The machine-accessible medium of claim 14, further comprising instructions to create a data structure of memory bandwidth requirements for each of the plurality of applications,
wherein the data structure of memory bandwidth requirements is based on any of a globally unique identifier (GUID), a plug and play identifier (PnPID), a vendor identifier (ID), and a Device ID.

* * * * *

UNITED STATES PATENT AND TRADEMARK OFFICE
CERTIFICATE OF CORRECTION

| | |
|---|---|
| PATENT NO. | : 7,243,041 B2 |
| APPLICATION NO. | : 10/957372 |
| DATED | : July 10, 2007 |
| INVENTOR(S) | : Nalawadi et al. |

It is certified that error appears in the above-identified patent and that said Letters Patent is hereby corrected as shown below:

In column 6, at line 33, delete "6" and insert --5--.

Signed and Sealed this

Eighth Day of April, 2008

JON W. DUDAS
*Director of the United States Patent and Trademark Office*